United States Patent
Coll Herrero et al.

(10) Patent No.: US 8,788,124 B2
(45) Date of Patent: Jul. 22, 2014

(54) SYSTEM AND METHOD FOR THE CALCULATION OF THE APPROACH SPEED DURING AIR TO AIR REFUELLING OPERATIONS

(71) Applicant: EADS Construcciones Aeronauticas S.A., Getafe (ES)

(72) Inventors: Francisca Coll Herrero, Getafe (ES); Jose Maria Miranda Orte, Getafe (ES)

(73) Assignee: EADS Construcciones Aeronauticas S.A., Madrid (ES)

( * ) Notice: Subject to any disclaimer, the term of this patent is extended or adjusted under 35 U.S.C. 154(b) by 0 days.

(21) Appl. No.: 13/909,252

(22) Filed: Jun. 4, 2013

(65) Prior Publication Data

US 2013/0334370 A1    Dec. 19, 2013

(30) Foreign Application Priority Data

Jun. 4, 2012   (ES) .................................. 201230854

(51) Int. Cl.
| | | |
|---|---|---|
| *G05D 1/00* | (2006.01) | |
| *G01P 3/38* | (2006.01) | |
| *G05D 1/02* | (2006.01) | |

(52) U.S. Cl.
CPC .. *G01P 3/38* (2013.01); *G05D 1/00* (2013.01); *G05D 1/0202* (2013.01)
USPC .......................................... 701/7; 244/135 A

(58) Field of Classification Search
None
See application file for complete search history.

(56) References Cited

U.S. PATENT DOCUMENTS

| | | | | |
|---|---|---|---|---|
| 5,530,650 | A * | 6/1996 | Biferno et al. | ................. 701/300 |
| 6,752,357 | B2 * | 6/2004 | Thal et al. | ................. 244/135 A |
| 7,171,028 | B2 * | 1/2007 | von Thal et al. | ............... 382/107 |
| 2003/0209633 | A1 | 11/2003 | Thal et al. | |
| 2004/0101167 | A1 | 5/2004 | Thal et al. | |
| 2011/0150284 | A1 * | 6/2011 | Son et al. | ...................... 382/103 |

FOREIGN PATENT DOCUMENTS

DE    10 2008 008 2    8/2009

OTHER PUBLICATIONS

Spanish Search Report dated Mar. 26, 2014 in ES 201230854.

* cited by examiner

*Primary Examiner* — John R Olszewski
*Assistant Examiner* — David Merlino
(74) *Attorney, Agent, or Firm* — Nixon & Vanderhye P.C.

(57) ABSTRACT

Systems and methods for the calculation of the approach speed during air to air refueling maneuvers. The systems comprise: a) capturing means of a sequence of digital photograms of the approach operation scenario calibrated in order to determine the real distance corresponding to a pixel of a photogram; b) computational means configured for obtaining the coordinates of the relative trajectory of the receiver aircraft with respect of the tanker aircraft, by means of a sequence of photograms of the approach operation obtained by said capturing means and calculating the speed difference between receiver aircraft and tanker aircraft based on the trajectory defined by the coordinates recorded in said process b1). The invention also refers to the methods for calculating the approach speed.

10 Claims, 2 Drawing Sheets

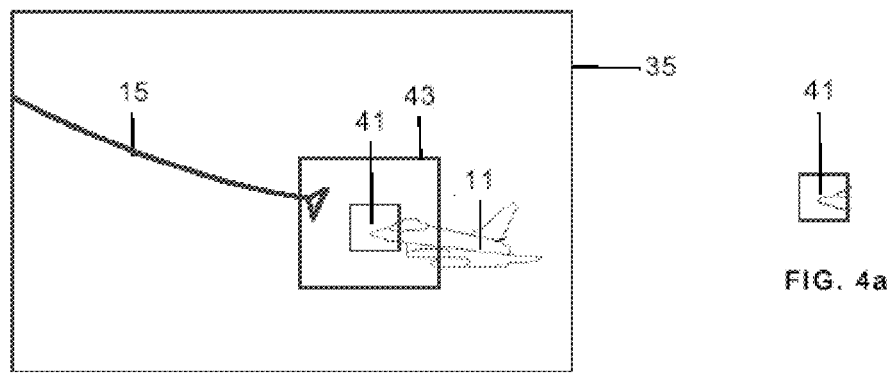
FIG. 4
FIG. 4a
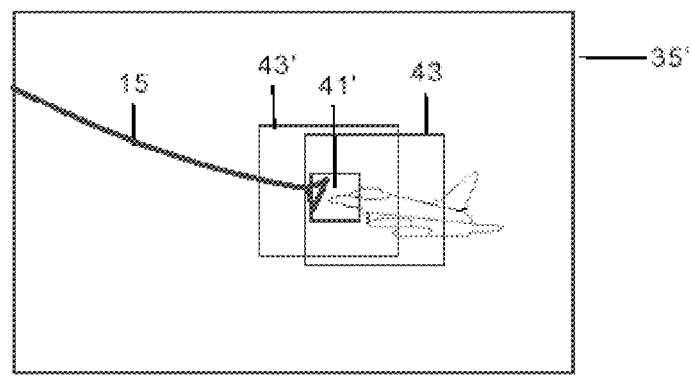
FIG. 5
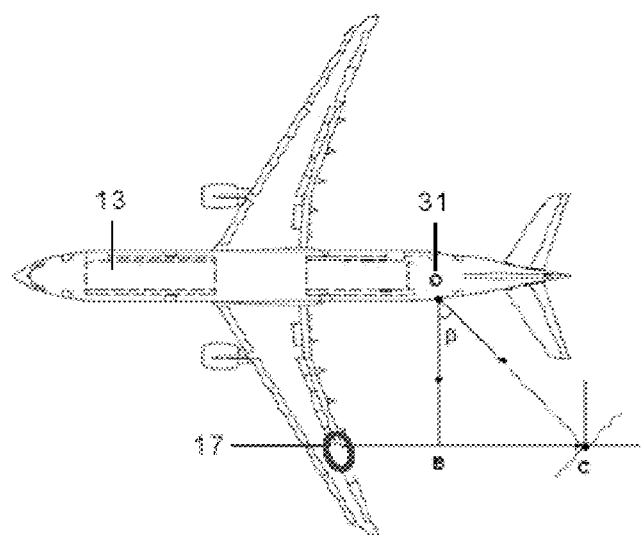
FIG. 6

SYSTEM AND METHOD FOR THE CALCULATION OF THE APPROACH SPEED DURING AIR TO AIR REFUELLING OPERATIONS

This application claims priority to ES Patent Application No. 201230854 filed 4 Jun. 2012, the entire content of which is hereby incorporated by reference.

FIELD OF THE INVENTION

This invention refers in general to air to air refueling and, more specifically, to the calculation of the approach speed of the receiver aircraft to the tanker aircraft.

PRIOR ART

FIG. 1 shows a known method for conducting air to air refueling operations that uses a hose and drogue device 15.

This refueling method employs a flexible hose 19 that is trailed from the tanker aircraft 13. Drogue 21 is an accessory that resembles a cone-vane or that is joined at its final extension with a valve to flexible hose 19. Drogue 21 stabilizes hose 19 in flight and provides a channel that helps the insertion of the probe 25 of receiver aircraft 11 on hose 19.

The hose and drogue device 19 is connected to a drum unit located in a gondola 17 of the tanker aircraft 13, in which it is rolled up when not in use. Gondola 17 may be located on a wing of tanker aircraft 13 as shown in FIG. 1, although it may also be located on the rear portion of fuselage.

Probe 25 of receiver aircraft 11 is a rigid arm located in the fuselage or in the nose of the aircraft. Probe 25 is normally withdrawn when not in use, especially on high speed aircraft. At the end of probe 25 there is a valve that is closed until it connects to hose 19, after which it opens and allows flux of fuel from tanker aircraft 13 to receiver aircraft 11.

The approach operation of a receiver aircraft 11 to a tanker aircraft 13 to carry out an air to air refueling operation is a delicate operation which, if not executed properly may result in failed approaches or, even rupture of the fuel shut off valve, thereby preventing the refueling operation of receiver aircraft 11.

One of the relevant aspects of the approach operation is the control of the differential speed between the receiver aircraft and the tanker aircraft, which must fall within a given range, and for which radio communications between the two aircraft are normally used. This has the drawback that the tanker aircraft does not have constant information in real time of the approach speed of the receiver aircraft that would enable it to efficiently direct the operation.

SUMMARY OF THE INVENTION

A purpose of the invention is to provide low cost systems and methods for calculating (especially in real time) the difference of speed between a receiver aircraft and a tanker aircraft in an approach operation for conducting refueling using a hose and drogue device.

In a first aspect, this purpose is obtained with a system that comprises means of capturing a sequence of digital photograms of the approach operation, said capturing means located on a place on the tanker aircraft that enables viewing it laterally, and computational means configured for obtaining the coordinates of the relative trajectory of the receiver aircraft with respect of the tanker aircraft by means of a process of sequential photograms of the approach operation, and for calculating on the basis of said trajectory the difference of speed between the receiver aircraft and the tanker aircraft. In said process an image of a portion of the aircraft is chosen as a pattern area that is searched for in the following photograms. The pattern area search in each photogram is not conducted on the full image of the photogram set, but rather within a reference framework of the pattern area of the previous photogram with the same midpoint and a size defined by a predetermined scaling factor.

A second aspect, the aforesaid purpose is obtained by means of a method that comprises the following steps: a) obtaining a sequence of digital photograms of the approach operation from a place on the tanker aircraft that enables laterally viewing it; b) obtaining the 2D coordinates of the relative trajectory between the receiver aircraft and the tanker aircraft; c) calculating the difference in speed between the receiver aircraft and the tanker aircraft based on said trajectory. The step b) comprises the following sub-steps: b1) choosing a small pattern area of the receiver aircraft in a first photogram in which a portion of the receiver aircraft is visible for obtaining the 2D coordinates of its midpoint and identifying a reference frame of said receiver aircraft having the same midpoint of the same shape and a size greater than the pattern area on a predetermined scaling factor; b2) searching the pattern area of the previous photogram in the next photogram within the reference frame identified in the previous photogram; using it as a new pattern area; and obtaining and recording the 2D coordinates of its midpoint, as well as the instant in time of the photogram; and identifying its reference frame; b3) repeating sub-step b2) for the rest of the photograms in the sequence.

In those tanker aircraft in which the hose and drogue device deploys from a gondola located on the wing of the tanker aircraft, the means of capturing the digital photograms (for example, a video camera) are located on the rear portion of the fuselage of the tanker aircraft.

Advantageously the calculation of the difference in speed between the receiver aircraft and tanker aircraft is done in real time.

In an embodiment of the invention, the pattern area and the reference mark have a square shape and the scaling factor between the number of pixels of each side of the reference mark and the pattern area comprises between 3 and 5.

Other desirable and advantageous features of the systems and methods for the calculation of the approach speed in air to air refueling manoeuvres according to the invention will be made clear on the basis of the following detailed description of the invention and of the attached claims in relation to the accompanying figures.

BRIEF DESCRIPTION OF THE DRAWINGS

FIG. 4 is a schematic view of an image of the refueling scenario displaying the chosen pattern area for identifying the receiver aircraft and a reference frame used in the process of obtaining the approach speed in accordance with the present invention.

FIG. 4a is a schematic view of an image of the pattern area.

FIG. 5 is a schematic view of the refueling scenario following the stage in FIG. 4.

FIG. 6 is a bottom plan view of a tanker aircraft showing the angular correction that must be made to the approach speed.

DETAILED DESCRIPTION OF THE INVENTION

Figure 1:
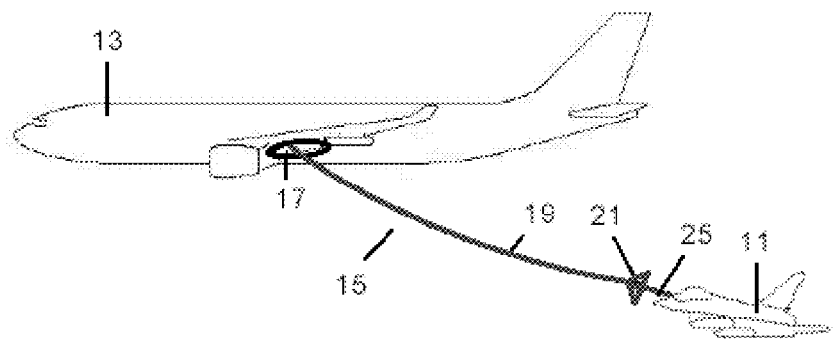
FIG. 1 is a schematic view of a refueling operation between a tanker aircraft and a receiver aircraft using a hose and drogue device.
Figure 2:
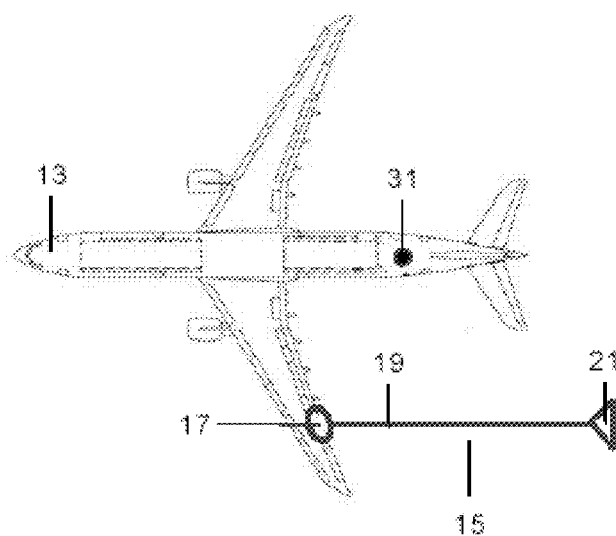
FIG. 2 is a bottom plan view of a tanker aircraft displaying the position of the hose and drogue device and the position of the video camera used in the present invention.

FIG. 2 shows tanker aircraft 13 having gondola 17 located on a wing from which hose and drogue refueling device 15 is deployed. This Figure also shows video camera 31 located at the rear portion of the fuselage of tanker aircraft 13 for capturing images of the refueling scenario around drogue 21.

Figure 3:
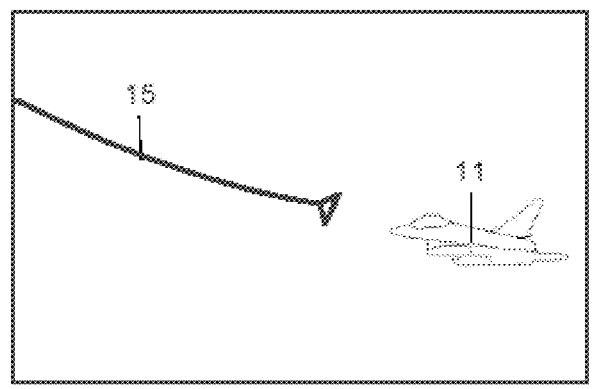
FIG. 3 is a schematic view of an image of the refueling scenario.

FIG. 3 shows an image taken by video camera 31 in which receiver aircraft 11 may be seen approaching hose and drogue device 15 of tanker aircraft 13.

Video camera 31 must be calibrated to be able to relate the pixels of the image with the real distances in the refueling scenario. This calibration may be carried out by identifying an object having known dimensions in an image, such as, for example, drogue 21.

The invention provides methods and systems for obtaining the differential velocity between receiver aircraft 11 and tanker aircraft 13, processing in a computer (not shown in the figures) located on tanker aircraft 13 a sequence of photograms provided by video camera 31 according to the following description.

The computer may be connected directly to video camera 31 or receive the photograms by telemetry.

A suitable video camera 31 for the invention would be, for example, a camera that provides digital photograms with a resolution of 704×576 pixels at a speed of 25 photograms per second.

The process begins at the discretion of the operator of tanker aircraft 13 who is watching the images provided by video camera 31 on the screen of the aforesaid computer in view of the evolution of the approach operation.

At this initial moment, shown in FIG. 4, in photogram 35 the operator selects pattern area 41 of receiver aircraft 11, chosen arbitrarily (the nose of receiver aircraft 11 has been chosen, however some other area could have been chosen), which automatically determines reference zone 43 having the same midpoint, shape, and a larger size at a predetermined scale that is identified by its position in photogram 35. Likewise, the 2D coordinates (in photogram 35) of the midpoint of pattern area 41 and the instant in time corresponding to photogram 35 are stored in a secondary memory of the computer.

Pattern area 41 and reference frame 43 have the same midpoint and square shape. As suggested in FIG. 4b, the chosen image of pattern area 41 is extracted from photogram 35 and stored in the secondary memory of the computer.

In the following photogram 35', shown in FIG. 5, pattern area 41 is searched for in the image contained in reference framework 43 (identified in previous photogram 35) using photogram image recognition techniques and, once found, is used as new pattern area 41' and stored in the secondary memory of the computer. Starting from pattern area 41', reference frame 43' is identified in photogram 35' (using the same scale as in the previous photogram) and, as in the previous case, the 2D coordinates of pattern area 41' and the instant in time corresponding to photogram 35' are stored in a secondary memory of the computer.

In an analogous manner, in the successive photograms n+1, the pattern area 41n identified in the previous photogram n is searched for in reference frame 43n having the midpoint in the 2D coordinates identified in the previous photogram n until the end of the sequence, storing in each photogram n+1 the 2D coordinates of the midpoint of the new pattern area 41n+1 and the instant in time corresponding to each photogram n+1.

In parallel to said image processing, the trajectory defined by the 2D coordinates of the midpoint of said pattern area 41 in the sequence of photograms is used for determining the differential speed between tanker aircraft 13 and receiver aircraft 11, using as a tool for calculating the derivative of the trajectory a digital filter such as, for example, the 5th order Super-Lanczos.

In an embodiment of the invention, photograms of 704×576 pixels, a pattern area of 26×26 pixels, and a reference frame of 80×80 pixels are used for processing the 25 photograms per second provided by video camera 31.

As shown in FIG. 6, when the orientation of video camera 31 in relation to contact point C of the receiver aircraft with the hose and drogue device (straight OC) is not at a 90° angle with the trajectory of the receiver aircraft (parallel to the tanker aircraft), the calculated differential velocity VA must be corrected by dividing it by the cosine β, which is known piece of data on a given tanker aircraft.

This differential velocity together with the proper trajectory may be displayed on the same screen on which the images taken by video camera 31 are displayed.

In light of the above, the following may be considered the basic features of said method:

- In each refueling operation, pattern area 41 is chosen, such that the method is applicable to any type of receiver aircraft.
- The search for pattern area 41 (having a small size) may be made within a reference frame having a much smaller size than the full photogram image, because it may be assumed that the shift of the receiver aircraft between two photograms occurs within the reference frame defined in the first photogram. This drastically reduces the computational requirements and enables calculations in real time.
- It is a low cost system (requiring a conventional video camera and computer) in comparison with alternative systems, such as, for example, a radar system.

Although the present invention has been described in relation to various embodiments, it must be understood that, based on the content, combinations of elements, variations or improvements may be made that are within the scope of the invention.

The invention claimed is:

1. A system for calculating the difference in speed between a receiver aircraft and a tanker aircraft in an approach operation for conducting a refueling operation using a hose and drogue device, characterized in that it comprises:
   a) capturing means of a sequence of digital photograms of the approach operation scenario located on a place of the tanker aircraft that enables laterally viewing said scenario, said capture means being calibrated in order to determine the real distance corresponding to a pixel of a photogram;
   b) computational means implemented for:
   b1) obtaining the coordinates of the relative trajectory between the receiver aircraft and the tanker aircraft by means of processing a sequence of photograms of the approach operation obtained by said capture means in which:
      following the selection in the first photogram of a pattern area of a predetermined size in which a portion of receiver aircraft is viewed, the storing of the 2D coordinates of its midpoint and the identifying of a reference frame having the same midpoint, shape and a larger size than that of pattern area by a predetermined scaling factor, in each photogram following the first the identification of a new pattern area as well as a new reference frame of the same pattern area, having the same features as in the photogram, searching in said new pattern area for the image in the reference frame of the previous photogram, the storing of 2D coordinates of the midpoint of new pattern area and the instant in time of the photogram;

b2) calculating the difference of the speed between receiver aircraft and tanker aircraft, based on the trajectory defined by the stored coordinates in process b1).

2. The system of claim 1 wherein the hose and drogue device is deployed from a gondola located on the wing of tanker aircraft and said capture means are located on the rear portion of the fuselage of tanker aircraft.

3. The system of claim 1, wherein the calculation of the difference of the speed between receiver aircraft and tanker aircraft is done in real time.

4. The system of claim 1 wherein pattern areas and reference frames have a square shape.

5. The system of claim 4, wherein the scaling factor between the number of pixels of each side of reference frames and pattern areas is comprised between 3 and 5 pixels.

6. A method for calculating the difference in speed between a receiver aircraft and a tanker aircraft in an approach operation for conducting a refueling operation using a hose and drogue device, wherein it comprises the following steps:
 a) obtaining a sequence of digital photograms of the approach operation from a place on the tanker aircraft that enables lateral viewing of said scenario knowing the real distance corresponding to a pixel of a photogram;
 b) obtaining the 2D coordinates of the relative trajectory of receiver aircraft shown in said sequence of photograms with respect of tanker aircraft by means of the following sub-steps:
  b1) selecting in the first photogram a pattern area of the receiver aircraft having a small size, in which a portion of receiver aircraft is visible, and obtaining and storing the 2D coordinates of its midpoint, and identifying a reference frame of pattern area having the same midpoint, shape, and a larger size than that of the pattern area of a predetermined scaling factor;
  b2) searching for pattern area of the previous photogram on the next photogram within the reference frame identified in the previous photogram and, once found, using it as the new pattern area, obtaining and storing the 2D coordinates of its midpoint, as well as the instant in time of photogram, and identifying and defining the reference frame of the said new pattern area in the same way as in the previous sub-step;
  b3) repeating sup-step b2) for the rest of the photograms of the sequence;
 c) calculating the difference of the speed between receiver aircraft and tanker aircraft, based on the trajectory defined by the 2D coordinates of each pattern area midpoint stored in step b).

7. The method of claim 6, wherein hose and drogue device is deployed from the gondola located on the wing of tanker aircraft and photograms are obtained from the rear portion of the fuselage of tanker aircraft.

8. The method of claim 6, wherein the calculation of the difference of the speed between receiver aircraft and tanker aircraft is done in real time.

9. The method of claim 6, in which pattern area and reference frame have a square shape.

10. The method of claim 9, wherein the scaling factor between the number of pixels on each side of reference frames and pattern areas is comprised between 3 and 5 pixels.

* * * * *